Oct. 8, 1957 B. O. MARSHALL, JR., ET AL 2,808,984
CODING DEVICE
Filed March 27, 1951 3 Sheets-Sheet 1

INVENTORS.
BYRON OGDEN MARSHALL JR.
JOHN DONALD DILLON
BY Wade Koontz
ATTORNEY and
James S. Shannon
AGENT Oct. 8, 1957 B. O. MARSHALL, JR., ET AL 2,808,984

CODING DEVICE

Filed March 27, 1951 3 Sheets-Sheet 2

INVENTORS.
BYRON OGDEN MARSHALL, Jr.
JOHN DONALD DILLON
BY Wade Koontz
ATTORNEY and
James S. Shannon
AGENT

CODING DEVICE

Filed March 27, 1951

INVENTORS.
BYRON OGDEN MARSHALL JR.
JOHN DONALD DILLON
BY Wade Koontz
ATTORNEY
and
James S. Shannon
AGENT-

United States Patent Office 2,808,984

Patented Oct. 8, 1957

2,808,984

CODING DEVICE

Byron O. Marshall, Jr., Pittsburgh, Pa., and John D. Dillon, Melbourne, Fla.

Application March 27, 1951, Serial No. 217,852

10 Claims. (Cl. 235—61)

(Granted under Title 35, U. S. Code (1952), sec. 266)

The invention described herein may be manufactured and used by or for the Government for governmental purposes without payment to use of any royalty thereon.

This invention relates to electrical coding devices and particularly to such devices for producing a digital code in the form of serially occurring electrical pulses. The device may be used to store the values, in digital form, of a function, such as the sine, cosine or logarithmic function, and, upon energization, to give the value of the function corresponding to a selected value of the independent variable. The device may also be used to store switching, operational or control procedures in digital code form and therefore finds utility in digital computing devices.

If a coding device of the above type is to be used in quantity it should contain a minimum of equipment, the values of the elements must not be critical and mass production methods should be capable of supplying completely satisfactory results. It is the object of the invention to provide a coding device of the above type satisfying these requirements.

The coding network, in accordance with the invention, is an electrical network in the form of a matrix consisting of a plurality of conductors interconnected by resistors. The stored numbers are determined solely by the manner in which the conductors of the network are joined, the resistors being inserted in the junctions merely to keep the impedance of the various parts of the network at a suitable level. The resistors are not in any way the analogues of the numbers; their resistance values are more or less equal and need not be accurately known. There is, however, a one-to-one correspondence between the digits of the number to be stored and the connection in the matrix.

The network also contains a number of switches, each of which relates to one of the ordered sets of digits constituting a stored number, and to each of which corresponds a single value of the argument. By closing a certain switch the network, upon energization, produces the value of the function corresponding to the selected value of the independent variable.

Although the principles of the coding device are applicable to any coding or number system, the network takes its simplest form when used with the binary system of numbers.

A more detailed description of the invention will be made with reference to the specific embodiments thereof shown in the accompanying drawings, in which.

Figure 1:
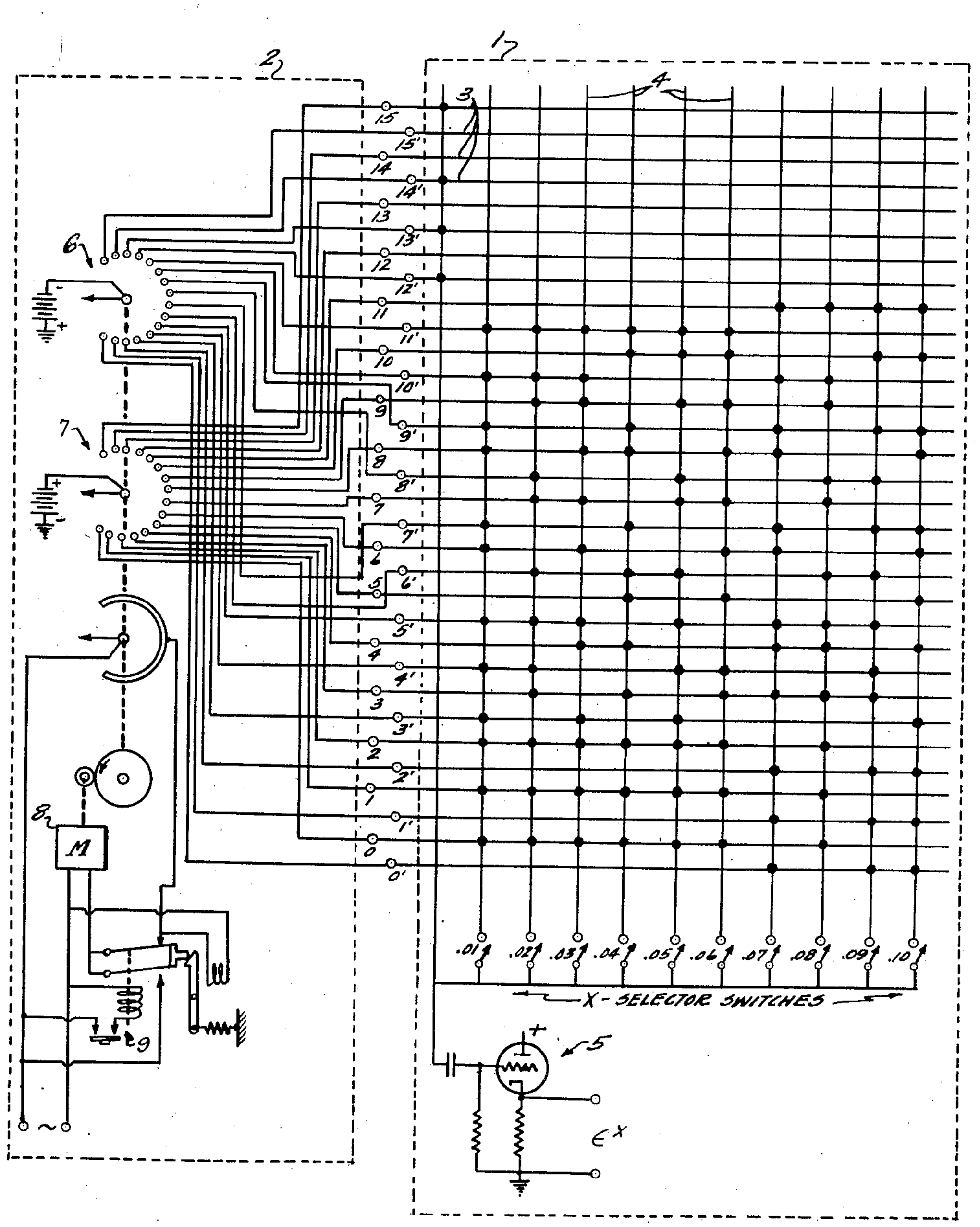
Fig. 1 shows a coding device in accordance with the invention for storing values of a mathematical function.

Fig. 1 shows a simple embodiment of the invention for storing the values of the function $\epsilon^x$ over a small range. The stored values are in the form of 16 place binary numbers. As is known, a binary number consists of an ordered arrangement of the two digits 1 and 0. Binary numbers are derived from the following general form, into which any positive quantity may be put:

$$A_n 2^n + A_{n-1} 2^{n-1} + A_{n-2} 2^{n-2} \dots + A_k 2^k \dots + A_0 2^0 + A_{-1} 2^{-1} + A_{-2} 2^{-2} + A_{-3} 2^{-3} \dots + A_{-k} 2^{-k} \dots + A_{-m} 2^{-m}$$

In the above expression, $n$ and $m$ are positive integers and the coefficients $A_k$ are either 1 or 0 depending upon whether or not the quantity $2^k$ or $2^{-k}$ appears in the expression for the particular quantity in question. The coefficients $A_k$ constitute the binary number, each coefficient having the value 1 or 0 depending upon whether or not the associated power of 2 is required in the case of the particular quantity to be represented. For example, the above general expression when set up to equal the quantity 37 11/16 would appear as follows:

$$1 \cdot 2^5 + 0 \cdot 2^4 + 0 \cdot 2^3 + 1 \cdot 2^2 + 0 \cdot 2^1 + 1 \cdot 2^0 + 1 \cdot 2^{-1} + 0 \cdot 2^{-2} + 1 \cdot 2^{-3} + 1 \cdot 2^{-4}$$

The sum of the terms in the above expression equals 37 11/16, and the corresponding binary number, which is composed of the coefficients of all the powers of 2 in the above expression is 100101.1011. The binal point, which is analogous to the decimal point in the decimal system, is placed in the binary number between the coefficients corresponding to the 0 and −1 powers of 2. The binal point serves as the starting point for evaluating a binary number. For example, the following steps show such an evaluation:

(1) 1 1 0 . 0 1 0 1

(2) $1 \cdot 2^2 + 1 \cdot 2^1 + 0 \cdot 2^0 + 0 \cdot 2^{-1} + 1 \cdot 2^{-2} + 0 \cdot 2^{-3} + 1 \cdot 2^{-4} =$ (3) $4 + 2 + 0 + 0 + \frac{1}{4} + 0 + \frac{1}{16} = 6\frac{5}{16}$ The following table shows values of the function $\epsilon^x$, in 16 place binary form, for values of X from .01 to .10, inclusive, in steps of .01:

*Table 1*

| X | $\epsilon^x$ |
|---|---|
| .01 | 1.000000101000111 |
| .02 | 1.000001010001111 |
| .03 | 1.000001111010111 |
| .04 | 1.000010100111111 |
| .05 | 1.000011010000111 |
| .06 | 1.000011111101111 |
| .07 | 1.000100101011000 |
| .08 | 1.000101010011111 |
| .09 | 1.000110000001000 |
| .10 | 1.000110101110000 |

Fig. 1 shows a resistance matrix 1, in accordance with the invention, for storing the above values of $\epsilon^x$. When this matrix is energized by a series of pulses from pulse generator 2 there appears in its output circuit a series of pulses representing, in binary code, one of the values of the function. The arrangement is such that in the output, positive pulses represent the units of the binary number and negative pulses represent the zeroes.

The resistance matrix comprises a first set of parallel conductors 3 and a second set of parallel conductors 4, the two sets being situated in parallel spaced apart planes. The conductors 3 and 4 must cross each other, preferably but not necessarily at right angles. The conductors 3 may be considered in pairs, each pair being connected to terminals marked 0—0′, 1—1′, 2—2′, etc., and each pair corresponding to one of the places in a 16 place binary number. The pulse generator 2 applies positive pulses in succession to terminals 0–15 and, simultaneously, negative pulses in succession to terminals 0′–15′, so that each pair of conductors has positive and negative pulses applied thereto at the same instant. Each of the sixteen places of the binary number therefor has a pair of corresponding conductors 3, one carrying positive pulses representing units and the other carrying negative pulses representing zeroes, so that by appropriate connection to one or the other of the conductors each place of the binary number may be made a unit or a zero as required. It is, of course, possible to represent a zero simply by the absence of a pulse in which case only half the conductors 3 shown in Fig. 1 would be required; however, the positive representation of a zero by a pulse having different polarity or other characteristic relative to the pulse representing a unit is the preferred arrangement.

Figures 2, 3:
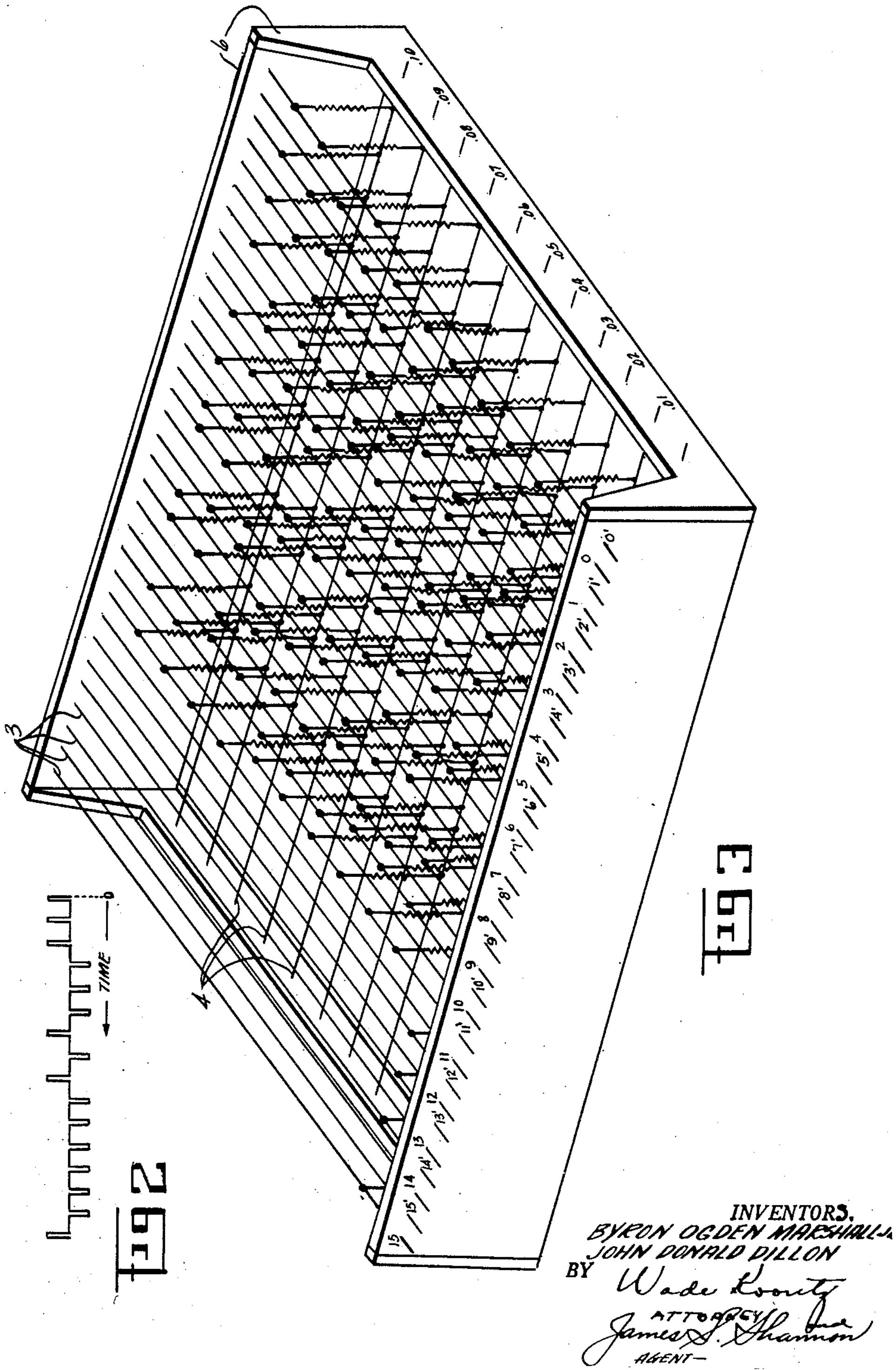
Fig. 2 represents the type output produced by the matrix of Fig. 1.
Fig. 3 shows the physical arrangement of the matrix of Fig. 1.

One conductor 4 for each value of the function in Table 1 is provided, plus one extra conductor 4. The conductors 4 are connected to the input circuit of cathode follower stage 5 through switches marked .01–.10, corresponding to the values of X in Table 1. The extra conductor 4, which is the first on the left in Fig. 1, is permanently connected to the input of stage 5. Appropriate connections, indicated by dots in Fig. 1, are made between the conductors 3 and each of the conductors 4 in accordance with digital make-up of the binary numbers in Table 1. It will be noted that the last four places, reading from right to left, of the binary numbers in Table 1 are the same in all numbers. Therefore, as a simplification of the matrix, the above mentioned extra conductor 4 is used for these places. If, for example, the switch corresponding to $X=.01$ is closed and the pulse generator 2 actuated, there will appear at the output of stage 5 a series of pulses, as shown in Fig. 2, that is representative of the value of the function, in binary form, for $X=.01$.

Since connections must be made between more than one of the conductors 4 and the conductors 3, direct connections between these sets of conductors are, of course, not possible. However, adequate isolation of the circuits may be obtained by inserting series resistances in these connnections. Therefore, each dot in Fig. 1 represents a resistive connection between the associated conductors 3 and 4. The value of this resistance should be considerably greater than the input impedance of stage 5. For a stage 5 input impedance of 5000 ohms the connecting resistors may have a value of 100,000 ohms. These values are not critical, however, and there may be considerable variation between individual resistors without affecting the operation of the matrix. The physical arrangement of conductors 3 and 4 and the interconnecting resistors for the matrix of Fig. 1 is shown in Fig. 3. The framework 6 in this figure may conveniently be made of insulating material, however, metal may be used provided suitable insulation between the conductors and the framework is provided.

The pulse generator 2 may be of any type capable of supplying the required simultaneous series of positive and negative pulses, and its design is not a part of the invention. The generator shown in Fig. 1 as an example is a simple mechanical type comprising two rotary switches 6 and 7 which generate pulses when their rotating contacts move at constant speed over their stationary contacts. Switch 7 generates positive pulses and has its stationary contacts connected to terminals 0–15, while switch 6 generates negative pulses and has its stationary contacts connected to terminals 0′–15′. The switches are driven by motor 8 which is of a constant speed, rapid start and stop type. Momentary depression of "operate" button 9 causes switches 6 and 7 to rotate counterclockwise though one complete cycle and stop. If the "operate" button is held in the depressed condition the switches will cycle repeatedly until release of the button, following which the mechanism will stop after the next cycle completion. If higher pulse repetition rates are required the pulse generator may be of the electronic type.

Figures 4, 5:
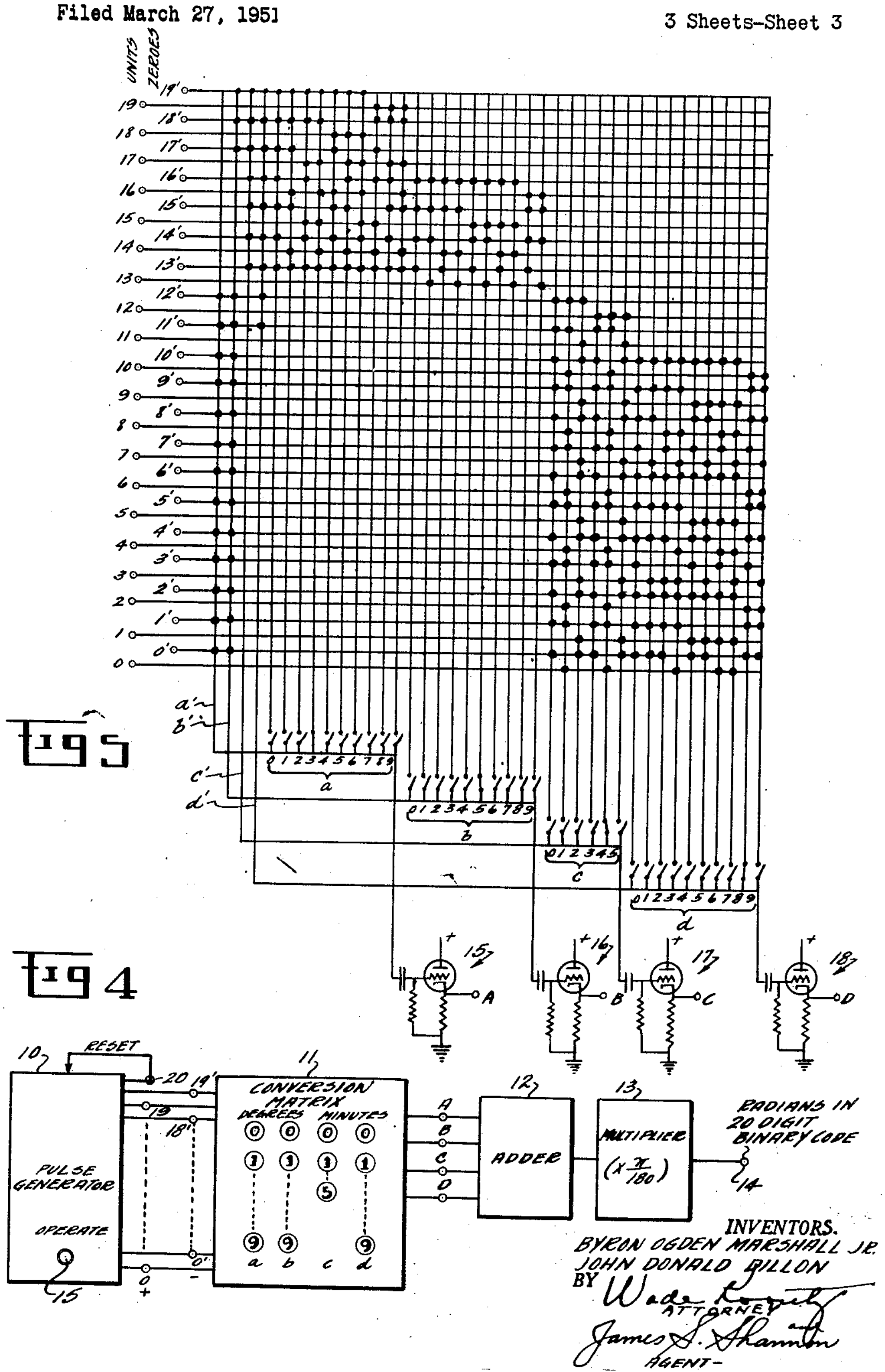
Fig. 4 shows a computer incorporating a matrix in accordance with the invention.
Fig. 5 shows the details of the matrix of Fig. 4.

Fig. 4 shows a computer, using a resistance matrix coding device in accordance with the invention, for converting angles expressed in degrees and minutes into radians in binary form. Pulse generator 10, when set into operation by depressing "operate" button 15, produces simultaneous series of 20 positive and 20 negative pulses, which are applied to terminals 0–19 and 0′–19′, respectively, of conversion matrix 11. The last or twenty-first pulse produced by the generator at terminal 20 may be used to reset the circuit.

Conversion matrix 11 has four rows of push buttons *a, b, c* and *d* representing tens of degrees, degrees, tens of minutes and minutes, respectively, so that the matrix may be set for any angle up to 99° 59′ in this case. The conversion matrix functions to produce pulse outputs in binary form at terminals A, B, C and D representing the quantities $10a$, $b$, $c/6$ and $d/60$, respectively, where *a, b, c* and *d* represent the numbers of the selected push buttons in columns *a, b, c* and *d*. Taking as an example the angle 35° 48′, the binary output at A will represent the quantity 30, that at B the quantity 5, that at C the quantity ⅔ and that at D the quantity $\frac{2}{15}$.

The output of adder 12 represents in binary form the sum of the outputs A, B, C and D, or the original angle 35° 48′. This binary number is then multiplied by $\pi/180$ in multiplier 13 so that the output thereof at terminal 14 represents the number of radians contained in the angle selected at the push buttons of the conversion matrix.

The pulse generator 10, the adder 12 and the multiplier 13 may all be standard known circuits for performing these functions and since their designs are not a part of the invention they will not be discussed further. The details of the conversion matrix 11 are shown in Fig. 5. The construction of this matrix is similar to the construction of the matrix shown in Figs. 1 and 3. Twenty pairs of pulse carrying conductors, numbered 0—0′ to 19—19′, are provided, the pulse generator 10, Fig. 4, applying a series of twenty positive pulses to terminals 0–19 and simultaneously a series of negative pulses to terminals 0′–19′. A total of forty output conductors are provided which may be divided into an *a*-group containing conductors *a′* and *a*–0 . . . *a*–9, a *b*-group containing conductors *b′* and *b*–0 . . . *b*–9, a *c*-group containing conductors *c′* and *c*–0 . . . *c*–5, and a *d*-group containing conductors *d′* and *d*–0 . . . *d*–9. The *a*-group of output conductors are used to store, in binary code quantities from 0–90 in steps of 10, by appropriate resistive connections indicated by dots in Fig. 5, between these conductors and the pulse carrying conductors 0—0′ to 19—19′. The *a′* conductor in this group is used to store the common part of the binary numbers stored by the group, thus greatly reducing the number of resistors required. Conductor *a′* is permanently connected to the input circuit of cathode follower stage 15, whereas conductors *a*–0 to *a*–9 are connected thereto through switches corresponding to the push buttons in column *a* of Fig. 4. The remaining groups *b, c* and *d* of output conductors are similar in all respects to group *a* except that the matrix connections therefor are such that group *b* stores quantities from 0 to 9 in steps of 1, group *c* stores quantities from 0 to ⅚ in steps of ⅙, and group *d* stores quantities from 0 to $\frac{59}{60}$ in steps of $\frac{1}{60}$.

Considering again as an example the angle 35° 48′, the matrix is set for this angle by closing push button switches *a*–3, *b*–5, *c*–4 and *d*–8, as shown in Fig. 5. Upon energization of the matrix by pulse generator 10 there appears at each of the output terminals A, B, C and D a series of twenty pulses which, if positive pulses are represented by units and negative pulses by zeroes, are as follows, reading from right to left:

| | | | |
|---|---|---|---|
| Output A | 0011110. 0000000000000= | 30 | |
| Output B | 0000101. 0000000000000= | 5 | |
| Output C | 0000000. 1010101010101= | | 5461/8192 |
| Output D | 0000000. 0010001000100= | | 273/2048 |
| Sum | 0100011. 1100110011001= | 35 | 6553/8192 |

The above four outputs are applied to element 12,

Fig. 4, where they are added. The output of the adder 12 therefore is a series of positive and negative pulses indicating the units and zeroes respectively of a binary number representing the sum of the aforementioned outputs A, B, C and D. The addition of these four outputs and the resulting sum are indicated above.

The output of adder 12 is applied to the input of circuit 13 which multiplies the applied number by the factor $$\frac{\pi}{180}$$

This multiplication is indicated below.

```
(A+B+C+D)   =                0100011.1100110011001
(π/180)     =               .00000100011101111001
                             ---------------------
                             01000111100110011001
                            10001111001100110 01
```

```
(A+B+C+D)   =                0100011.1100110011001
(π/180)     =               .00000100011101111001
                             --------------------
                             01000111100110011001
                           1000111100110011001
                          1000111100110011001
                        1000111100110011001
                       1000111100110011001
                     1000111100110011001
                   1000111100110011001
                  1000111100110011001
                1000111100110011001
               ----------------------------------
(A+B+C+D)π/180=.1001111111101011011101000001010001
```

The above binary number representing the product $$(A+B+C+D)^{\frac{\pi}{180}}$$

corresponds to the number of radians in 35° 48′. Assuming the multiplier 13 to have a 20 place output, the pulse output obtained at terminal 14 will correspond to the first 20 places, counting from the binal point, of the above product. Evaluating these first 20 places gives $655{,}031\times2^{-20}$ radians, or, in decimal form, .6248 radians. The output at terminal 14, therefore, is a binary code representing the number of radians in the angle set into the conversion matrix 11.

We claim:

1. A coding device comprising a plurality of conductors arranged in pairs, in which each pair of conductors corresponds to a place in a serial two-character code and in which one of the conductors in each pair corresponds to one of said characters and the other conductor corresponds to the other of said characters; cyclic means for similarly energizing each of said pairs of conductors once in each cycle of operation, said pairs being energized one at a time and in a predetermined sequence, said energization consisting of the application of an electric pulse to one of the conductors of the pair and the simultaneous application of an electric pulse distinguishable from the aforementioned pulse to the other conductor of the pair; a plurality of output circuits; and passive impedance means connecting each of said output circuits to one of the conductors in each of said pairs of conductors.

2. A coding device comprising a plurality of conductors arranged in pairs, in which each pair of conductors corresponds to a place in a binary number and in which one of the conductors in each pair corresponds to the unit digit and the other conductor corresponds to the zero digit of binary notation; cyclic means for similarly energizing each of said pairs of conductors once in each cycle of operation, said pairs being energized one at a time and in a predetermined sequence, said energization consisting of the application of an electric pulse to the unit conductor and the simultaneous application of an electric pulse distinguishable from the aforementioned pulse to the zero conductor; a plurality of output circuits; and passive impedance means connecting each of said output circuits to one of the conductors in each of said pairs of conductors.

3. A device for storing a plurality of binary numbers having a predetermined number of places; said device comprising a plurality of conductors arranged in pairs, in which each pair of conductors corresponds to a place in a binary number and in which one of the conductors in each pair corresponds to the unit digit and the other conductor to the zero digit of binary notation; cyclic means for similarly energizing each of said pairs of conductors once in each cycle of operation, said pairs being energized one at a time and in a predetermined sequence, said energization consisting of the application of an electric pulse to the unit conductor and the simultaneous application of an electric pulse distinguishable from the aforementioned pulse to the zero conductor; a common output conductor and a plurality of distinct output conductors; passive impedance means connecting said common output conductor to one of the conductors in each of said pairs of conductors corresponding to those places that are identical in all of the stored binary numbers; passive impedance means connecting each of said distinct output conductors to one of the conductors in each of said pairs of conductors corresponding to those places that are not identical in all of the stored binary numbers; an output circuit; means permanently connecting said common output conductor to said output circuit; and means for selectively connecting each of said distinct output conductors to said output circuit.

4. Apparatus as claimed in claim 3 in which means are provided for supporting said pairs of conductors in parallel relationship in one plane and for supporting said output conductors in parallel relationship in another plane that is parallel to said one plane with the conductors in the two planes at right angles, and in which said passive impedance connecting means extend along lines normal to said planes and intersecting the conductors to be connected.

5. A device for converting decimal numbers having a maximum of $n$ places into $m$ place binary numbers in electrical pulse form, said device comprising a plurality of conductors arranged in $m$ pairs in which each pair corresponds to a place in a binary number, and in which one conductor of each pair corresponds to the unit digit and the other conductor to the zero digit of binary notation; means for applying electrical pulses of one polarity in succession to the unit conductors; means operating simultaneously with the preceding means for applying electrical pulses, of polarity opposite to that of the aforementioned pulses, in succession to the zero conductors; $n$ groups of output conductors, each group corresponding to a place in a decimal number and consisting of a common output conductor and ten distinct output conductors corresponding respectively to the ten digits of the decimal system; $n$ output circuits corresponding respectively to said $n$ groups of output conductors; passive impedance means connecting said common output conductor in each group to one of the conductors in each of said pairs of conductors corresponding to those places that are identical in the binary numbers associated with the group; passive impedance means connecting each of said distinct ouptut conductors in each group to one of the conductors in each of said pairs of conductors corresponding to those places that are not identical in the binary numbers associated with the group; means permanently connecting the said common output conductor in each group to the output circuit corresponding to that group; individual switches for selectively connecting each of the said distinct output conductors in each group to the output circuit corresponding to that group and means for adding the binary numbers appearing in each output circuit in serial pulse form, as a result of the said application of positive and negative pulses to said pairs of conductors, to produce a binary sum in serial pulse form.

6. A device for storing a table of values of a function in binary number form; said device comprising a plurality of conductors arranged in pairs, in which each pair of conductors corresponds to a place in a binary number and in which one of the conductors in each pair corresponds to the unit digit and the other conductor corresponds to the zero digit of binary notation; cyclic means for similarly energizing each of said pairs of conductors once in each cycle of operation, said pairs being energized one at a time and in a predetermined sequence, said energization consisting of the application of an electric pulse to the unit conductor and the simultaneous application of an electric pulse distinguishable from the aforementioned pulse to the zero conductor; a plurality of output conductors each corresponding to a value of the argument of said function, passive impedance means connecting each of said output conductors to one of the conductors in each of said pairs of conductors; an output circuit and means for selectively connecting each of said output conductors to said output circuit.

7. A coding device comprising a plurality of conductors each corresponding to a place in a serial binary code, cyclic means for similarly energizing each of said conductors once in each cycle of operation, said conductors being energized one at a time and in a predetermined sequence, said energization being in the form of an electric pulse, a plurality of output cicruits, and passive impedance means connecting each of said output circuits to certain of said conductors.

8. A device for storing a plurality of binary numbers having a predetermined number of places, said device comprising: a plurality of conductors each corresponding to a place in a binary number, cyclic means for similarly energizing each of said conductors once in each cycle of operation, said conductors being energized one at a time and in a predetermined sequence, said energization being in the form of an electric pulse, a common output conductor and a plurality of distinct output conductors, passive impedance means connecting said common output conductor to certain of those conductors corresponding to those places that are identical in all of the stored binary numbers, passive impedance means connecting each of said distinct output conductors to predetermined ones of said conductors corresponding to those places that are not identical in all of the stored binary numbers, an output circuit, means permanently connecting said common output conductor to said output circuit, and means for selectively connecting each of said distinct output conductors to said output circuit.

9. A device for converting decimal numbers having a maximum of $n$ places into $m$ place binary numbers in electrical pulse form, said device comprising $m$ conductors each corresponding to a place in a binary number, means for applying similar electrical pulses in succession to said conductors, $n$ groups of output conductors, each group corresponding to a place in a decimal number and consisting of a common output conductor and ten distinct output conductors corresponding respectively to the ten digits of the decimal system, $n$ output circuits corresponding respectively to said $n$ groups of output conductors, passive impedance means connecting said common output conductor in each group to certain of said $m$ conductors corresponding to those places that are identical in the binary numbers associated with the group, passive impedance means connecting each of said distinct output conductors in each group to certain of said $m$ conductors corresponding to those places that are not identical in the binary numbers associated with the group, means permanently connecting the said common output conductor in each group to the output circuit corresponding to that group, individual switches for selectively connecting each of the said distinct output conductors in each group to the output circuit corresponding to that group, and means for adding the binary numbers appearing in each output circuit in serial pulse form, as a result of the application of said electrical pulses to said $m$ conductors, to produce a binary sum in serial pulse form.

10. A device for storing a table of values of a function in binary form, said device comprising: a plurality of conductors each corresponding to a place in a binary number, cyclic means for similarly energizing each of said conductors once in each cycle of operation, said conductors being energized one at a time and in a predetermined sequence, said energization being in the form of an electric pulse, a plurality of output conductors each corresponding to a value of the argument of said function, passive impedance means connecting each of said output conductors to certain of the first mentioned plurality of conductors, an output circuit, and means for selectively connecting each of said output conductors to said output circuit.

References Cited in the file of this patent

UNITED STATES PATENTS

| | | |
|---|---|---|
| 2,428,811 | Rajchman | Oct. 14, 1947 |
| 2,473,444 | Rajchman | June 14, 1949 |
| 2,558,460 | Rajchman | June 26, 1951 |
| 2,570,716 | Rochester | Oct. 9, 1951 |
| 2,590,950 | Eckert | Apr. 1, 1952 |
| 2,657,856 | Edwards | Nov. 3, 1953 |
| 2,679,975 | Grosvalet | June 1, 1954 |
| 2,686,299 | Eckert | Aug. 10, 1954 |
| 2,686,632 | Wilkinson | Aug. 17, 1954 |
| 2,697,549 | Hobbs | Dec. 21, 1954 |
| 2,729,811 | Gloess | Jan. 3, 1956 |

OTHER REFERENCES

Proc. of the I. R. E. (2), "Electronic Computing Circuits of the ENIAC"; (pp. 756–767), August 1947.

Proc. of the I. R. E. (1), "A Multichannel PAM–FM Radio Telemetering System"; January 1951 (pp. 36–43).